Nov. 26, 1957   E. E. WIECZOREK   2,814,449
CENTRIFUGAL OILING SYSTEM FOR GARBAGE DISPOSAL UNIT
Filed Jan. 31, 1955
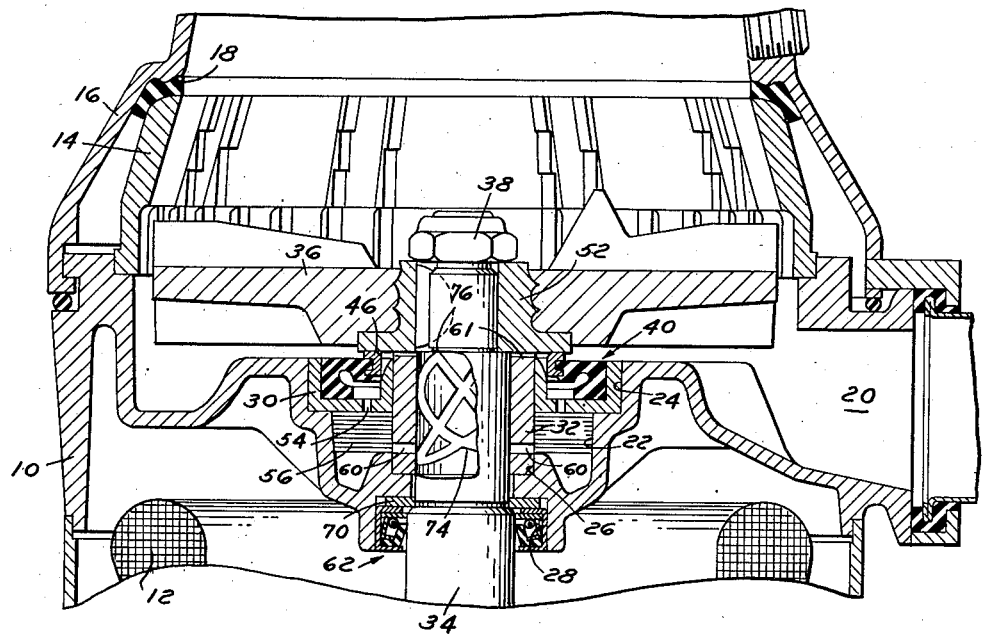
FIG. 1
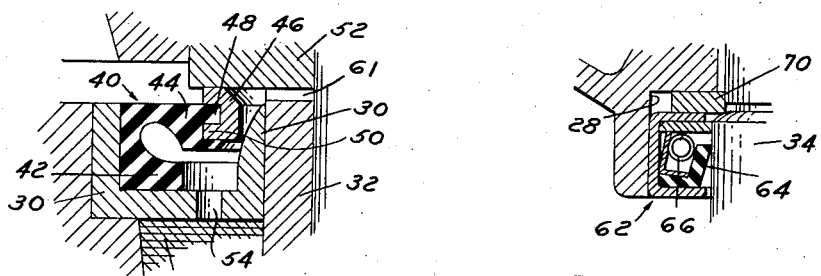
FIG. 2
FIG. 3
INVENTOR.
EUGENE E. WIECZOREK
BY
ATTORNEYS

United States Patent Office 2,814,449
Patented Nov. 26, 1957

2,814,449

CENTRIFUGAL OILING SYSTEM FOR GARBAGE DISPOSAL UNIT

Eugene E. Wieczorek, Racine, Wis., assignor to In-Sink-Erator Manufacturing Company, Racine, Wis., a corporation of Wisconsin Application January 31, 1955, Serial No. 485,275

5 Claims. (Cl. 241—46)

This invention relates to a garbage disposal unit and more particularly to a lubrication and seal design for the rotating shaft thereof.

In most garbage disposal units in common use today a driving motor is mounted in the base with a vertical shaft which passes up into a comminuting chamber, where it is keyed to a rotor or comminutor. It has been a problem to provide a new seal around this shaft at the point where it enters the comminuting chamber since the latter chamber is passing fluid in its operation. The problem is to keep the fluid out of the motor chamber while maintaining lubrication at this particular bearing point of the shaft.

It is an object of the present invention to provide a combination seal and centrifugal lubricant system which provides an adequate seal, both for the liquid on the outside and the lubricant on the inside, thus maintaining a lubricated bearing at all times which is not subject to the corrosive effect of the water and the acids passing through the comminuting chamber.

Drawings accompany the specification, and the various views thereof may be briefly described as:

Figure 1, a vertical section through the assembly showing the relationship of the parts.

Figure 2, an enlarged view of a portion of the seal.

Figure 3, an enlarged view of another portion of the seal around the shaft.

Referring to the drawings, a motor end bell 10 is provided at the top of the motor, the windings of which are illustrated at 12. On the top of the end bell is a comminutor ring 14 held in place by an outer housing 16 in co-operation with a rubber ring 18. The discharge outlet for the end bell is shown at 20, and centrally of the end bell housing is formed a bearing chamber 22 having a recess 24 at the top end, a recess 26 opened upwardly near the bottom and a recess 28 opened downwardly at the bottom.

In the cup-like recess 24 there is mounted a cold-formed steel annulus 30 opened at the top, which supports at the center a bronze graphite bearing 32 which seats in the recess 26 at the bottom end. A motor shaft 34 projects upwardly through the bearing 32 and has keyed to the top thereof a comminutor rotor 36 held on by a nut 38. Lying in the annulus 30 is a neoprene seal ring 40 having a main body portion 42 and an inwardly extending annular grooved portion 44 which co-operates with an SAE 64 bronze sealing ring 46. The ring 46 has an outwardly facing groove which co-operates with a lip 48, the lower edge 50 of ring 46 being received in the groove of lip portion 44. Thus, the bronze ring 46 is resiliently supported on the molded ring 40. Preferably before assembly, the ring 46 lies above its assembly position so that when the core 52 of the rotor 36 moves into place on the shaft it will bear down against the ring 46, creating a resilient pressure between the ring 46 and the core 52. The ring 46 can be formed of other materials or shaped into the ring 40 but must be of such consistency that it can maintain a moving seal contact with the rotor 36 or a portion thereof.

The bottom of the annulus 30 is provided with holes 54 which will bleed oil down into recess 22, this recess being filled with a felt wicking 56. This recess is actually an oil reservoir chamber which opens to the inside of bushing 32 through radial openings 60 in the bushing. The bushing is notched at the top edge at 61 to allow oil to pass over to annulus 30. Recess 28 contains a standard raw-hide pump shaft seal 62 with a raw-hide ring 64 urged toward shaft 34 by a coiled spring 66. A spacer ring 70 is interposed between seal 62 and the bottom of recess 28. The bushing 32 is graphited and is provided with double spiral grooves 74, which feed oil upwardly regardless of the direction of the shaft to the juncture 76, where it is thrown centrifugally outward through notches 61 past the bronze bearing 32 to the seal ring 46. The oil passes downwardly at this point into the annulus 30 and back to the reservoir chamber 22.

In a garbage disposal unit the shaft is in many cases rotated in reverse directions, and it is necessary that the seals be designed for this reversing action. With the above arrangement it will be seen that there is a positive pressure seal between ring 46 and core 52 and a constant replenishment of lubricant to the shaft in the area of bearing 32. The bearing is thus designed for long operation without the addition of lubricant, and there is also provided a seal against the entrance of liquid from the outside by reason of the resilient and running seal 46.

I claim:

1. In a waste disposal unit, a self-lubricating and sealing bearing assembly for the rotating shaft and rotor, which comprises a housing having a main cup-shaped recess provided with a central shaft bore in the bottom wall thereof, a first annular, open-topped recess surrounding said bore at the bottom of the main recess and a second annular, open-topped recess at the rim of said main recess, and a third recess opening to and around said bore below the bottom wall of said housing, a cylindrical bushing member seated in said first annular recess extending upwardly to the top of said cup, a channel-shaped annulus ring seated in said second recess, the inner wall of said annulus ring being in contact with and around the upper portion of said bushing, a sealing assembly in said ring comprising a contact ring positioned to shift axially adjacent the outer surface of the inside wall of said annulus ring and having an outer groove, a resilient sealing and mounting ring of generally L-shaped cross section having the base of the L mounted on the inside surface of the outer wall of said annulus ring and the other leg of the L projecting radially toward the inner wall of said annulus ring and into the groove of the contact ring, a comminuting rotor, a shaft rotatable in said bore and bushing, and a radial flange on said shaft mounting said rotor at the top of said housing and extending outwardly over and in axial contact with said contact ring urging said ring downwardly against the resilience of said sealing and mounting ring, and passages in said annulus ring and said bushing whereby oil from the top of the shaft may pass to the main recess and back to said shaft.

2. A device as defined in claim 1 in which a shaft seal is provided in said third recess and said bushing is grooved spirally to carry oil upwardly to the top of said bushing and said shaft.

3. In a vertically disposed waste disposal unit having a housing enclosing a suspended electric motor and a rotor mounted on the shaft thereof, a self-lubricating and sealing bearing assembly for the rotating shaft and rotor which comprises a bearing housing in the form of a cup above the electric motor having a cylindrical bushing mounted on the bottom thereof, a channel-shaped ring mounted at the rim of the bearing housing supporting said bushing at the top, a comminuting rotor, a shaft passing through the bottom of said cup and mounted in said bushing, means on said shaft for mounting said comminuting rotor, a radially extending surface associated with said shaft and rotor above said bushing and cup extending outwardly over a portion of said channel-shaped ring, a sealing contact ring slidably mounted adjacent the inner wall of said first-named ring, and resilient means within said first-named ring closing the channel thereof and supporting said sealing contact ring resiliently against said radial surface.

4. A device as defined in claim 3 in which the channel of said first-named ring is open to the inside of said cup and said cup is adapted to retain a body of lubricating liquid, and means are provided to feed said liquid from said cup to said shaft at the bottom of said cup, said shaft and bushing being formed to move lubricating liquid upwardly to said radial surface where it may move by centrifugal force into said first-named ring.

5. A device as defined in claim 4 in which a sealing means surrounds said shaft below the bottom of said cup and below the point where oil from said cup returns to said shaft.

References Cited in the file of this patent

UNITED STATES PATENTS 2,282,883    Powers _____ May 12, 1942